United States Patent [19]

Hegedus et al.

[11] Patent Number: 5,059,640

[45] Date of Patent: Oct. 22, 1991

[54] EPOXY CORROSION-RESISTANT COATING

[75] Inventors: Charles R. Hegedus, Warrington, Pa.; Donald J. Hirst, Mt. Laurel, N.J.; Anthony T. Eng, Philadelphia, Pa.; William J. Green, Clementon, N.J.

[73] Assignee: The United States of America as represented by the Secretary of the Navy, Washington, D.C.

[21] Appl. No.: 593,416

[22] Filed: Sep. 28, 1990

Related U.S. Application Data

[63] Continuation-in-part of Ser. No. 442,085, Nov. 28, 1989, which is a continuation-in-part of Ser. No. 331,200, Mar. 28, 1989, Pat. No. 4,885,324, which is a continuation of Ser. No. 211,026, Jun. 16, 1988, abandoned.

[51] Int. Cl.$^5$ ............................................. C08L 63/00
[52] U.S. Cl. .................................. 523/451; 523/456; 523/459
[58] Field of Search ......................... 523/451, 456, 459

[56] References Cited

U.S. PATENT DOCUMENTS 4,845,136  7/1989  Seito et al. ........................... 523/451

*Primary Examiner*—Maurice J. Welsh
*Attorney, Agent, or Firm*—James V. Tura; James B. Bechtel; Susan E. Verona

[57] ABSTRACT

This invention relates to a corrosion-resistant coating capable of being applied to various substrates, e.g., particularly metal and plastic surfaces, as a single coat characterized as having a high-gloss, good adhesion and a high degree of flexibility. The corrosion inhibiting composition comprises an epoxide resin containing an effective amount of a corrosion-inhibiting pigment system consisting essentially of critical amounts of at least one zinc phosphate, zinc molybdate and at least one zinc salt of a benzoic acid.

15 Claims, No Drawings

EPOXY CORROSION-RESISTANT COATING

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of copending application Ser. No. 07/442,085 pending filed on Nov. 28, 1989 which in turn is a continuation-in-part of copending application Ser. No. 07/331,200 filed March 28, 1989 now U.S. Pat. No. 4,885,324 which in turn is a continuation of application 07/211,026 filed June 16, 1988, now abandoned.

BACKGROUND OF THE INVENTION

This invention relates to coating compositions and more specifically to corrosion-resisting coating compositions which can be applied by various methods directly onto surfaces and particularly metal surfaces and/or polymeric or plastic substrates without the need for an undercoat.

Metal substrates, and particularly metal exposed to extreme environmental conditions, require the protection of coatings capable of resisting corrosive environments, e.g., ships and military aircraft are exposed to seawater spray and other corrosive agents including not only saltwater spray but various acid forming gases, e.g. sulfur dioxide and the like. In addition to ships and aircraft, particularly military aircraft, various types of machinery and farm equipment used in an industrial environment where fossil fuels generate corrosive agents need protection against reagents such as surfur and other acid forming gases. In addition to corrosion, it is important that the coatings useful in these environments be resistant to various chemicals and have physical characteristics which enable them to be applied to the substrate without difficulty. These coatings should also exhibit good adhesion and have a high degree of flexibility.

Presently, coatings attempting to comply with one or more of the above mentioned requirements rely on the use of a plurality of films, i.e. an undercoat with a topcoat, comprising, for example, an epoxy undercoat and a polyurethane topcoat. The epoxy primers used in the military are specifically designed to adhere to metal surfaces. These primecoats, however, generally require a topcoat, since the primers do not have the required flexibility, particularly at low temperatures, and therefore results in extensive cracking and/or blistering in areas which are highly flexible. Moreover, the primer coats are not generally resistant to harsh weather conditions and are difficult to formulate in the multi-colors required for military aircraft. The epoxy coating compositions of this invention, however, are not only resistant to harsh weather conditions and the various chemicals including saltwater and acidic components, but have also the required degree of flexibility. In addition, it was necessary heretofore to provide a plurality of films of the coatings thereby forming a total dry film thickness ranging up to about 0.005 inches e.g. up to 10 mils or greater which adds considerable weight to the aircraft. Thus, not only does the multi-coat finishes utilized heretofore require a plurality of film thickness but are also very time consuming in applying since it is necessary to allow sufficient drying time between each application. Moreover, it is obvious that the removal of the two coat system can likewise be difficult and time consuming and requires the use of large amounts of organic solvents causing objectionable emissions.

In accordance with this invention, the corrosion resistant costings comprise an epoxy binder, i.e. an epoxy resin such as the bisphenol-A epichlorohydrin condensation products which have molecular weights ranging up to 300,000. More specificallly, the coating compositions of this invention comprises approximately 100 parts by weight of an epoxy resin in combination with about 0 to 1000 parts by weight of at least one organic paint solvent for said resin and from about 0 to 140 parts by weight of a $TiO_2$ pigment, i.e. titanium dioxide pigment in the form of vesiculated beads or combinations of $TiO_2$ beads and pigment and from about 0.01 to 300 parts by weight of a combination of corrosion-inhibiting pigments consisting essentially of about 10 to 120 parts by weight of at least one zinc phosphate, 40 to 260 parts by weight of zinc molybdate, and 1 to 30 parts by weight of at least one zinc salt of a benzoic acid, e.g. substituted zinc benzoate. For purposes of this invention, all three of the zinc salts, as disclosed herein, are essential in their relative proportions to provide the corrosion resistance required for coatings. Other pigments, and particularly, spherical $TiO_2$ particles and the vesiculated beads e.g. $TiO_2$ beads may be used in combination with the three zinc salts as disclosed herein.

The coating composition of this invention maybe applied as a single coat directly onto a hard surface such as metal, plastic or polymeric surfaces and do not require an undercoat or a top coat to provide a high gloss, corrosion resistant film. It is generally known that low gloss coatings are appropriate for camouflage purposes particularly on most of the outer exposed surfaces of military aircraft and the like. On the other hand, low gloss coatings are not appropriate for the internal or unexposed surfaces such as the areas around engine inlets, ducts, landing gears, etc. Moreover, aircraft other than the military aircraft, require high gloss and high visibility coatings. It was therefore believed that in order to obtain a coating exhibiting outstanding corrosion resistance, the amount of pigment, i.e. (PVC) pigment volume concentration had to be realtively high which would therefore result in a low gloss finish. It was believed that it was not possible to obtain a final coat which had a high gloss and good corrosion resistance at a high pigment volume concentration.

SUMMARY OF THE INVENTION

This invention relates to a corrosion-resistant coating capable of being applied to various substrates as a single top coat having high-gloss, good adhesion and a high degree of flexibility. The corrosion inhibiting coating composition comprises an epoxide resin and a corrosion inhibiting pigment system consisting essentially of critical amounts of zinc phosphate, zinc molybdate and at least one zinc salt of a benzoic acid.

It is an object of this invention to provide a glossy, corrosion-resistant coating, which can be applied directly onto a surface without the need for an undercoat.

It is another object of this invention to provide a coating which is resistant to corrosion and various other chemicals, is flexible, resistant to different weather conditions and has good adhesion to metal substrates.

It is still a further object of this invention to provide a corrosion resistant coating capable of reducing the time, the manpower and the materials normally required for applying said coating on various substrates.

It is still a further object of this invention to provide a one-coat system useful for both military and civilian aircraft of substantially reduced thickness which reduces the weight added to the aircraft while at the same time providing the necessary corrosion resistance.

These and other objects of the invention are accomplished by providing an epoxy resin containing an unique combination of pigments which can be applied on a variety of substrates.

DETAILED DESCRIPTION OF THE INVENTION

This invention relates to a relatively high-gloss, corosion resistant coating composition which functions as the primary coat or topcoat, has good adhesion characteristics, is highly flexible and resistant to chemical and corrosive environments. More specifically, this invention is directed to a relatively high-gloss, corrosion-resistant coating which comprises for each 100 parts by weight of an epoxy resin, e.g., an epoxy ester from about 0 to 1000 parts by weight of at least one organic paint solvent and preferably from about 50 to 500 parts by weight of the solvent including xylene, toluene, mineral spirits and combinations thereof, and from about 0 to 140 parts by weight of $TiO_2$ pigment e.g., preferably from about 40 to 100 parts by weight of $TiO_2$ pigment. The $TiO_2$ pigment may consist of from about 0 to 100 per cent by weight of the total amount of $TiO_2$ of vesiculated beads. In addition to the above, the coating composition must contain from about 0.1 to 300 parts by weight and preferably from about 20 to 100 parts by weight of a combinaton of corrosion inhibiting pigments consisting essentially of about 10 to 100 parts by weight of at least one zinc phosphate, 40 to 260 parts by weight of zinc molybdate, and 1 to 30 parts by weight of at least one zinc salt of a benzoic acid, e.g. zinc benzoate and/or a zinc salt of a substituted benzoic acid wherein the substituants include $NO_2$ and/or hydroxy radicals. More specifically, the epoxy resin coating composition as disclosed herein in addition to containing all three of the zinc salts, i.e., zinc phosphate, molybdate and benzoate, may contain up to 140 parts by weight of a $TiO_2$ pigment wherein 10 to about 100 percent by weight of the total amount of $TiO_2$ in the coating is in the form of $TiO_2$ beads or a combination of said beads with spherical $TiO_2$ pigment.

Generally, the epoxide resin can be any epoxy resin having two or more epoxy groups. The most common are produced by the reaction of epoxides with polyhydric phenols to produce polyglycidyl ethers. Resins of this type include diglycidyl ethers of bisphenol A; glycidyl ethers of glycerol; and glycidyl ethers of long-chain bisphenol. These epoxide resins are commercially available under such tradenames as Araldite, by Ciba Company, Inc. and Epon, by Shell Chemical Company. Other commercial resins are derived from the reaction of polyhydroxy phenols with epihalohydrins and particularly epichlorohydrin. These resins have molecular weights in the range of 300–10,000. Some of these resins are disclosed in U.S. Pat. Nos. 2,467,171; 2,581,464; 2,582,985 and 2,615,007, the disclosures of which are incorporated herein by reference. Included are the cyclic and acyclic aliphatic epoxy resins which do not contain the phenolic structure associated with the more conventional epoxy resins.

The epoxy resins may be defined more specifically as containing two or more epoxy groups. The epoxy groups can be terminal epoxy groups or internal epoxy groups. The polyglycidyl compounds for example contain a plurality of 1-2 epoxide groups derived from the reaction of a polyfunctional active hydrogen containing compound with an excess of an epihalohydrin under basic conditions. When the active hydrogen compound is a polyhydric alcohol or phenol, the resulting epoxide contains glycidyl ether groups. The preferred polyglycidyl compounds are derived by the condensation reactions of 2,2-bis(4-hydroxyphenyl)propane, known as bisphenol-A. The bisphenol-A epoxy resins are available commercially under trade names such as "Epon 828," "Epon 1001", and "Epon 1009" from Shell Chemical Co., and as "DER 331", and "DER 334" from Dow Chemical Co. and Apogen 101, (methylolated bisphenol-A resin (Schaefer Chemical Co.). Other suitable polyepoxides can be prepared from polyols such as a pentaerythritol, glycerol, butanediol or trimethylol propane etc. and an epihalohydrin. In a preferred embodiment, the organic binder comprise an epoxy resin derived from the condensation of bisphenol-A and epichlorohydrin. The epoxy resins may include, for example, the bisphenol-A epichlorohydrin condensation products which have average molecular weights ranging from about 1,000 to 500,000. These resins may include the polyol-epoxy resins which comprise alkylene oxides; the polyolefin epoxy resins which comprise epoxypolybutadiene; the epoxy polyester resins comprising units of epoxyacrylates; the epoxyurethane resins comprising urethane groups and the polyhydroxypolyether, polyhydroxypolyetherester or polyhydroxypolyester epoxy resins derived from the glycidyl etherified or glycidyl esterified polyvalent carboxylic acids.

Some of the urethane-modified epoxy resins have average molecular weights of 1,000 to 20,000, with the polyol epoxy resins having average molecular weights of 6,000 to 60,000 when prepared from epichlorohydrin, bisphenol-A and dibasic acids. Specific epoxy resins include the epoxypolyester resins, polyhydroxypolyether, polyhydroxypolyether-ester and polyhydroxypolyester epoxy resins. These resins may be used alone or with small amounts of other resins such as the phenolic resins, melamine resins, epoxypolybutadiene resins, etc. to improve the adhesion, elasticity, etc. The urethane-modified epoxide resins for example exhibit comparatively strong adhesion. In general, the epoxy resins are provided in solution at concentrations of 20 to 60% by weight, and therefore it may not be necessary to add additional solvent. However, various solvents may be used in the coating including xylene, toluene, mineral terpene, methyl ethyl ketone, methyl isobutyl ketone, ethyl cellosolve, butyl cellosolve, cellosolve acetate, ethyl acetate, butyl acetate, methyl isobutyl carbinol, isopropanol, n-butanol, cyclohexanone or mixtures thereof in any proportion. Usually, the content of the non-volatile components in the coating composition of this invention ranges from about 10 to 90% e.g., 25–50% by weight of the total composition. The amount of solvent may vary depending on the viscosity and method of application of the coating onto the substrate.

A preferred binder for the coating compositions comprises epoxy resins characterized by the presence of two or more epoxy groups, in combination with a curing agent. Preferably, the epoxy resin is obtained from the reaction of epichlorohydrin and a polyol, such as 4,4'-isopropylidenediphenol (bisphenol-A). These epoxy resins are normally liquids or have a low molecular weight and are soluble in various aliphatic solvents such as ketones, esters, ether alcohols or any of the aromatic solvents such as xylene, etc. The second component of the epoxy binder is the amine curing agent for the epoxide. Amine curing agents include the aliphatic and aromatic amines, and in particular the tertiary amines, $C_2$-$C_{30}$, preferably $C_2$-$C_{10}$ polyamines, polyamides, and amine adducts. The preferred curing agents are the $C_2$-$C_{10}$ polyamines that contain two or more reactive hydrogen groups and amine-terminated polyamide compositions, including those formed through the condensation of unsaturated fatty acids with $C_2$-$C_{10}$ aliphatic polyamines having at least three amino groups per molecule. Examples of amine curing agents include triethylene tetramine, m-phenylenediamine, 3-diethylamino-1-propylamine, Versamid 100, 115 and 125 resins, ethylene diamine, m-xylylene diamine, 3,3'-iminobispropylamine, tetraethylene pentamine, etc. Sufficient amounts of the amine curing agent are employed to assure substantial crosslinking of the epoxide resin. Generally stoichiometric amounts or slight excess of the amine curing agent are employed. Amine curing agents are normally used in amounts varying from 20 to 75 wt. percent based upon the type of epoxy resin.

The pigment system of this invention is unique in that it consists essentially of at least one zinc phosphate, e.g. zinc-barium phosphate, a zinc salt of benzoic acid or a substituted benzoic acid and zinc molybdate. These three zinc salt pigments alone or in combination with other known pigments, e.g. $TiO_2$, provide a coating having outstanding corrosion characteristics which enables a single film of the coating to be used as a primer or as the topcoat. Of the various zinc salts of benzoic acids, it was found that the preferred zinc benzoates include the benzoic acid salts having at least one substituent, i.e. the hydroxol and/or the nitro ($NO_2$) substituant. The preferred zinc phosphates, e.g. zinc-barium phosphate, are commercially available as Phos-Plus (J0866) from the Minerals Pigment Corporation. The zinc molybdates are well known zinc compounds commercially available as Moly-White. In addition to the zinc salts pigment system as disclosed herein, other known pigments, particularly titanium dioxide, zinc oxide and the like may be used in the coating to provide reinforcing characteristics and to add color, opacity and hiding power to the coating. In addition, other additives well known in the coating art such as color or tinting agents may be added to the binder in small but effective amounts and include such compounds as antimony oxides, barium sulfate, calcium carbonates and one or more of the organic pigments such as the phthalocyanine colors, e.g. greens or blues, etc.

It was unexpected to find that the combination of zinc molybdate, the zinc salts of benzoic acid and the zinc phosphates synergistically improved the corrosion resistance of the coating even at low concentrations. It was found also that the specific combination of the zinc molybdate, zinc salts of benzoic acid and zinc phosphates in the relative ratio's stated herein improved the corrosion-resistance substantially when compared to the use of either one of these zinc salts alone. Thus, by decreasing the pigment volume concentration (PVC) of the pigment system in the epoxy binder, a higher gloss coating can be obtained without impairing the corrosion resistance.

In general, the coatings are prepared by mixing all of the ingredients into the epoxy binder and applying the film-forming composition to the substrate in thicknesses ranging from about 0.001 to 0.005 inches or up to about 20 mils and preferably from about 1 to 10 mils thickness. A dispersion or solution of the coating may be accomplished by conventional mixing methods including the use of agitation with a mixer, ball mills, etc. The application of the coating onto the substrate e.g. metal surface, may be made by known coating procedures such as spraying, dipping, brushing, roller coating, etc. The viscosity of the coatings for the particular application may be adjusted by the addition of one or more known organic solvents within the numerical ranges disclosed herein. After the coating is applied to the surface, the solvent is allowed to evaporate at room or elevated temperatures and the film cures to a coating having the desired characteristics.

The particular zinc phosphate used in preparing the coating composition had an average particle size of about 5.0 microns and is characterized as a zinc-barium phosphate. The zinc salt of benzoic acid was specifically characterized as having at least one hydroxyl group and nitro ($NO_2$) substituent with a molecular weight of about 100–500, a density of about 2–3 grams per mililiter and a particle specific surface area of $16m^2$/gram. The benzoic acid salts were commercial products obtained from BASF identified as Sicorin-RZ. The zinc molybdate has a particle size average of about 4.0 microns and is commercially available as Moly-White 101. The titanium dioxide is preferably spherical with a particle size of about 0.25 microns. The term zinc phosphate includes the mixed zinc salts and particularly the zinc-barium phosphates, zinc-aluminum phosphates and various combinations of zinc phosphate with mixed zinc phosphate salts in any proportion.

The coating composition may optionally contain other additives such as an ultraviolet light stabilizer, an antioxidant, or both. The ultraviolet light stabilizer can be present in amounts of 1–10% by weight, based on the weight of the binder; the antioxidant can be present in amounts of 0.1–3% by weight, based on the weight of the binder. Typical ultraviolet light stabilizers are benzophenones, triatriazoles, triazines, benzoates, substituted benzenes, organophosphorous sulfides, and substituted nitriles. The coating composition of this invention may also contain other known materials, such as driers, antioxidants, gellants, fungicides, etc. in amounts for their intended function, and various solvents for such materials. Thus, organic salts (e.g., an octoate or naphthenate) of metals (e.g., cobalt, calcium, zirconium, manganese, bismuth or antimony) are available from Nuodex Corporation under the name "Nuxtra". The coating composition may also contain fillers which may or may not have pigmentary properties. These fillers are exemplified by talc, silica, barium sulfate, calcium sulfate, calcium carbonate, calcium silicate, iron oxides, mica, aluminum silicate, clay and mixtures thereof.

The coating composition of this invention can be applied to a variety of substrates by any of the conventional application methods. Substrates that can be coated with the composition are, for example, metal, wood, glass, or plastics such as polypropylene, polystyrene, copolymers and the like. The coating is suited also for application over pretreated or unprimed metal.

The hydrocarbon solvents useful for purposes of this invention includes a mixture of solvents, e.g. mixtures of one or more paint solvents such as benzene, toluene, xylene, and aromatic naphtha. Other solvents include the ester solvents such as ethyl acetate, butyl acetate, cellosolve, hexyl acetate, amyl acetate, ethyl proprionate, and butyl proprionate. Ketone solvents include acetone, methyl ethyl ketone, methyl isopropyl ketone, methyl isobutyl ketone, diethyl ketone, and cyclohexanone. Glycol ester solvents include ethylene glycol monoethyl ether acetate, diethylene glycol monoethyl ether acetate, etc.

The coating was found to have outstanding performance when exposed to extreme heat conditions, high intensity of light and water, extreme cold conditions, hot lubricating oils and other chemicals normally found in aircraft operations. By utilizing the coating composition of this invention, a high gloss corrosion resistant film can be obtained on various substrates as the top coat. The coating has properties which function as a primer and more important as a top coat highly adherent, flexible, chemical resistant and resistant to all weather conditions. The coatings of this invention lowers the risk of failure due to cracking especially at low temperatures and are easily touched-up since only one coating need be applied. Since one coat is sufficient, it needs less time for application and removal and saves on manpower that would generally be needed in the preparation of a high gloss two coat system. Moreover, the present coating provides protection at lower film thicknesses thereby reducing the weight of the coating compared to a two coat paint system which is important for aircraft coatings.

The following illustrate the coating compositions of this invention.

EXAMPLE I (EPOXY-POLYAMIDE)

EXAMPLE I

| (EPOXY-POLYAMIDE) | |
|---|---|
| Components | Parts by Weight |
| Epoxy Resin (75% solids EPON-1001) | 27.3 |
| TiO$_2$ (50% VSBD) | 28.6 |
| Zinc-Barium Phosphate (Phos-Plus J0866) | 2.9 |
| Zinc Salt of nitro-substituted Benzoic Acid (Sicorin-RZ) | 0.3 |
| Zinc Molybdate (Molywhite) | 5.8 |
| Organic Paint Solvents | 12.2 |
| Polyamide (Versamid-115 at 50% solids) | 22.9 |
| | 100.0 |

The above composition has the following characteristics:

| |
|---|
| PVC = 0.23 |
| Density (g/ml) = 1.38 |
| VOC (g/l) = 420 |
| Vol. % Solids = 0.55 |

EXAMPLE II (EPOXY-ESTER)

EXAMPLE II

| (EPOXY-ESTER) | |
|---|---|
| Components | Parts by Weight |
| Epoxy-Ester (60% Solids) (Varkyd 6-60x) | 51.1 |

EXAMPLE II-continued

| (EPOXY-ESTER) | |
|---|---|
| Components | Parts by Weight |
| TiO$_2$ (50% VSBD) | 29.0 |
| Zinc Phosphate | 3.0 |
| Zinc Benzoate | 0.3 |
| Zinc Molybdate | 5.9 |
| Organic Solvents | 10.7 |
| | 100. |

The above composition has the following characteristics:

| |
|---|
| PVC = 0.23 |
| Wet Density (g/ml) = 1.36 |
| Weight % Solids = 0.69 |
| Vol. (g/l) = 419.9 |

The degree of anti-corrosion performance of the coating can be measured by ASTM test D610-68 entitled "Evaluating Degree of Rusting on Painted Steel Surfaces", ASTM D1654-79a entitled "Evaluation of Painted or Coated Specimens Subjected to Corrosive Environments", and ASTM D714-56 entitled "Evaluating Degree of Blistering of Paints". The coating can be tested further in ASTM B117-73, entitled "Method of Salt Spray (Fog) Testing" wherein the composition is applied onto steel panels wich are scribed and subjected to salt-fog spray. Scribing is achieved by scratching an "X" in the coating through to bare steel using a cutting tool. The amount of rusting at the scribe is assessed on a scale of 0–10 where 10 is no corrosion and 0 is complete failure. Ratings of 5 and above are acceptable for anti-corrosive compositions tested in accordance with ASTM D-1654-79.

Scribe creepage or underfilm corrosion is determined in accordance with ASTM D1654-79a on a scale of 0–10 where 10 is no corrosion and 0 is ⅜ inch or more creepage from the scribe. The test panels and conditions are identical to those set forth above. Ratings of 3 or above are acceptable for anti-corrosive compositions. Blistering in a coating is determined in accordance with ASTM D714-56. This method describes blister size as numbers 2, 4, 6, 8, and 10, where 2 is a large blister ¼ inch or larger in diameter, 8 is a small blister less than 1/16 inch in diameter and 10 is the absence of blistering. Blister density is described as D means dense, MD means medium dense, M means medium, and F means few.

It is obvious that there are other variations and modifications which can be made with respect to this invention without departing from the spirit and scope of the invention as particularly set forth in the appendant claims.

The Invention Claimed:

1. A coating composition comprising about 100 parts by weight of an epoxy resin from about 0 to 1000 parts by weight of at least one organic solvent, from about 0–140 parts by weight of a TiO$_2$ pigment, and from about 0.01 to 300 parts by weight of a combination of corrosion-inhibiting pigments consisting essentially of about:

(a) 10–120 parts by weight of a zinc phosphate,
(b) 40–260 parts by weight of zinc molybdate, and
(c) 1–30 parts by weight of at least one zinc salt of a benzoic acid.

2. The coating composition of claim 1 further characterized in that the salt is a zinc benzoate.

3. The coating composition of claim 2 further characterized in that the zinc phosphate is a zinc-barium phosphate.

4. The coating composition of claim 3 further characterized in that from 0 to 100% by weight of the total amount of the $TiO_2$ pigment in the coating is in the form of vesiculated beads.

5. The coating composition of claim 4 further characterized in that from 10 to about 50% by weight of the total amount of the $TiO_2$ pigment in the coating is in the form of vesiculated beads.

6. The coating composition of claim 4 further characterized in that the $TiO_2$ pigment is present in the coating in an amount ranging from about 40-100 parts by weight.

7. The coating composition of claim 1 further characterized in that the combination of corrosion-inhibiting pigments is present in an amount ranging from about 20 to 100 parts by weight.

8. The coating composition of claim 1 further characterized in that the solvent is present in an amount ranging from about 50 to 500 parts by weight and the combination of corrosion-inhibiting pigments consist essentially of about:
   (a) 30-100 parts by weight of a zinc-barium phosphate,
   (b) 60-210 parts by weight of a zinc molybdate, and
   (c) 3-25 parts by weight of a zinc salt of a benzoic acid.

9. The coating composition of claim 8 further characterized in that the zinc salt of the benzoic acid is a substituted benzoic acid.

10. The coating composition of claim 9 further characterized in that the substituted benzoic acid is a hydroxy and $NO_2$-substituted benzoic acid.

11. The coating composition of claim 9 further characterized in that the substituted benzoic acid is a $NO_2$-substituted benzoic acid.

12. A method of preparing a corrosion-inhibiting coating which comprises adding to an epoxy resin from about 0.01 to 300 parts by weight for every 100 parts by weight of resin of a combination of pigment consisting essentially of from about 10 to 120 parts by weight of a zinc phosphate, 40 to 260 parts by weight of zinc molybdate and 1 to 30 parts by weight of at least one zinc salt of benzoic acid.

13. The method of claim 12 further characterized in that from about 50 to 500 parts by weight of at least one organic solvent is present for each 100 parts by weight of said epoxy resin.

14. The method of claim 13 further characterized in that the coating contains from about 0 to 140 parts by weight of $TiO_2$ pigment.

15. The method of claim 14 further characterized in that the zinc phosphate is a zinc barium phosphate and 10 to 50 percent by weight of the total amount of $TiO_2$ pigment is in the form of vesiculated beads.

* * * * *